(12) United States Patent
Matsumoto et al.

(10) Patent No.: US 7,181,518 B1
(45) Date of Patent: Feb. 20, 2007

(54) METHOD OF AND SYSTEM FOR CREATING PROFILES

(75) Inventors: Yasuhide Matsumoto, Kawasaki (JP); Masahiko Murakami, Kawasaki (JP); Hideto Kihara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 525 days.

(21) Appl. No.: 09/628,190

(22) Filed: Jul. 28, 2000

(30) Foreign Application Priority Data

Sep. 24, 1999 (JP) ................................. 11-270652

(51) Int. Cl.
*G06F 15/173* (2006.01)

(52) U.S. Cl. ...................... 709/224; 709/203; 709/206; 709/217

(58) Field of Classification Search ................ 709/203, 709/204, 205, 206, 217–219; 345/758
See application file for complete search history.

(56) References Cited

U.S. PATENT DOCUMENTS

| | | | | |
|---|---|---|---|---|
| 5,784,568 A | * | 7/1998 | Needham .................... 709/234 |
| 5,793,365 A | * | 8/1998 | Tang et al. ................. 715/758 |
| 5,796,393 A | * | 8/1998 | MacNaughton et al. ..... 715/733 |
| 5,802,253 A | * | 9/1998 | Gross et al. .................. 706/47 |
| 5,828,839 A | * | 10/1998 | Moncreiff ................... 709/204 |
| 5,828,843 A | * | 10/1998 | Grimm et al. .............. 709/228 |
| 5,894,556 A | * | 4/1999 | Grimm et al. .............. 709/227 |
| 5,987,503 A | * | 11/1999 | Murakami ................. 709/204 |
| 6,212,548 B1 | * | 4/2001 | DeSimone et al. ......... 709/204 |
| 6,219,045 B1 | * | 4/2001 | Leahy et al. ................ 715/757 |
| 6,336,948 B1 | * | 4/2002 | Teibel ........................ 709/204 |
| 6,446,112 B1 | * | 9/2002 | Bunney et al. ............. 709/204 |
| 6,484,196 B1 | * | 11/2002 | Maurille ..................... 709/206 |
| 6,606,644 B1 | * | 8/2003 | Ford et al. .................. 709/203 |
| 6,721,410 B1 | * | 4/2004 | Will ....................... 379/202.01 |
| 6,721,748 B1 | * | 4/2004 | Knight et al. ................ 707/10 |
| 6,807,563 B1 | * | 10/2004 | Christofferson et al. .... 709/204 |
| 2001/0011273 A1 | | 8/2001 | Matsui et al. | |

FOREIGN PATENT DOCUMENTS

| | | | |
|---|---|---|---|
| JP | 08147310 A | * | 6/1996 |
| JP | 10028135 A | * | 1/1998 |
| JP | 11-96101 | | 4/1999 |

* cited by examiner

*Primary Examiner*—Ario Etienne
*Assistant Examiner*—LaShonda Jacobs
(74) *Attorney, Agent, or Firm*—Staas & Halsey LLP

(57) ABSTRACT

A profile creation system is provided to enable easy communications within virtual spaces. URLs and categories are stored in the category DB 13, such that the URLs and the categories are correlated to each other. Every time a user sends a URL on a conversation system such as the IRC, a category that corresponds to the URL is identified, and stored in the user data DB 14 such that the category is correlated to the user. By having valid periods in the entries of the user data DB 14, it is possible to create a profile that reflects a user's current status. It is also possible to include rating data in the user data DB 14, along with the category. By processing messages within a channel based on the rating data and user's category, it is possible to make communications within a virtual space easier and more effective.

13 Claims, 7 Drawing Sheets

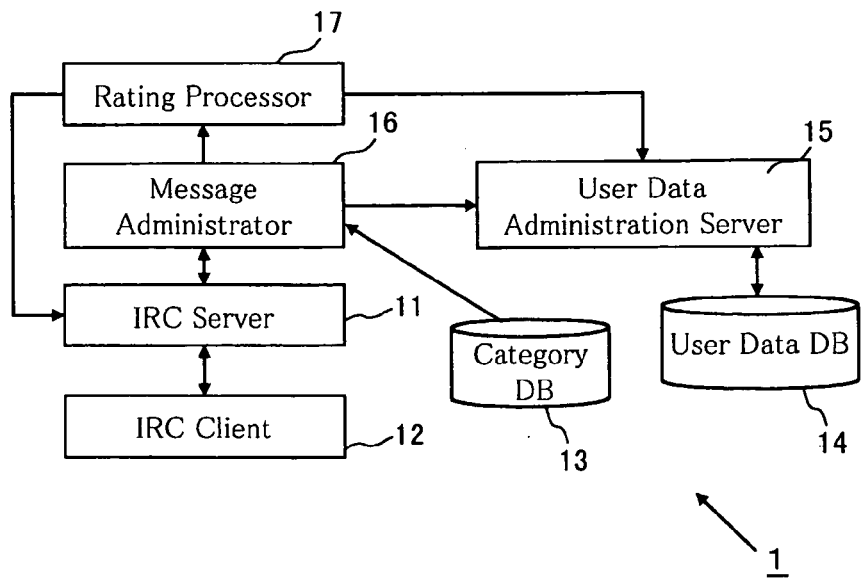

Fig. 3

| | | | |
|---|---|---|---|
| User ID | ID0001 | | |
| Password | XXXXX | | |
| Chat-Related Data | Current Nickname | taro | |
| | Currently Participating Channel | #aa,#bb,#cc,.... | |
| | Current Client Host Name | xxx.xxx.xxx | |
| | Currently Connected Server | sss.sss.sss | |
| | ⋮ | ⋮ | |
| Personal Data | Name | Fujitsu, Taro | |
| | Age | 30 | |
| | Occupation | Public Official | |
| | ⋮ | ⋮ | |
| | Rating Data | 0 | |
| Message Attribute Data | Hobby | Number of Message | 15 |
| | | Message 1 | Contents of Message | URL1 |
| | | | Channel | #AAA |
| | | | Date | 1999/06/07 13:55 |
| | | | Valid Period | 1 month |
| | | | Related Users | ID0002, ID0003 |
| | | Message 2 | Contents of Message | URL2 |
| | | | Channel | #BBB |
| | | | Date | 1999/06/17 13:55 |
| | | | Valid Period | 6 months |
| | | | Related Users | ID0002, ID0004 |
| | | ⋮ | ⋮ | ⋮ |
| | Internet | Number of Messages | 30 |
| | | ⋮ | |

Message Data = {Contents of Message, Channel, Date, Valid Period, Related Users} for Message 1.

Fig. 4

| Category | Weight |
|----------|--------|
| Hobby    | $C_1$  |
| Column   | $C_2$  |
| Internet | $C_3$  |
| ⋮        | ⋮      |

Fig. 5

| Harmful Comments Level | Process |
|------------------------|---------|
| $\geq X_1$ | Disconnect connection with server |
| $\geq X_2$ | Cancel message at server |
| $\geq X_3$ | Reject message for a certain period of time |
| $\geq X_4$ | Warning from server |

Fig. 7

13:53>#AAA:hanako< Anything interesting?

13:55>#AAA:taro< Look at URL1!

13:56>#AAA:jiro< I recommend that site too.

14:01>#AAA:saburo< How amazing!

Fig. 8

| Contents of Message | Channel | Date | Number of Message to be Monitored |
|---|---|---|---|
| URL1 | #AAA | 1999/06/07 13:55 | 2 |
| URL2 | #CCC | 1999/06/07 13:55 | 0 |
| ⋮ | ⋮ | ⋮ | ⋮ |

METHOD OF AND SYSTEM FOR CREATING PROFILES

BACKGROUND OF THE INVENTION

1. Technical Field

The present invention relates to a technology that supports communication between users who exchange text messages in a conversation system on a real time basis.

In the present invention, a conversation system refers to a system that includes a plurality of conversation devices. The Conversation devices are connected to a network. The Conversation devices can share a virtual space formed on the network to exchange text messages among each other on a real time basis.

An IRC (Internet Relay Chat) is a type of a conversation system that is structured in compliance with an IRC protocol (RFC1459). The IRC includes an IRC server and IRC clients that are connected to the IRC server via the Internet. The IRC clients share a virtual space called a channel to exchange text messages on a real time basis. The IRC server broadcasts a message from an IRC client to other IRC clients who participate in the same channel. In the IRC, each of the IRC clients is uniquely defined by an identifier called nickname. Each channel is assigned a channel name, which uniquely identifies the channel.

2. Description of Related Art

Recently, conversation systems in which a plurality of users can conduct conversation on a real time basis have become popular means of communication. Examples of such conversation systems include IRC and Nifty's forum, which have become increasingly popular as the Internet has come to be more widely used. On the other hand, as the Internet has become more popular, various web page information search services and access control services that control access to web pages offered by WWW (World Wide Web) servers have been developed and offered. In providing such services, URL (Uniform Resource Locators, RFC 1738) are being categorized by certain categories. Accordingly, the URL has come to be utilized as an index of the category.

A conversation system such as IRC has tens of thousands of virtual spaces, which are shared by users who can be physically separated by a large. Upon entering such a virtual world, often a user is not able to know in advance what kind of people with whom he/she is sharing the virtual space, or what topics of conversation he/she should discuss with them. For instance, in the case of real world conversations, people mutually adjust the subject and/or timing of conversation based on the relationships between the participants. Facial expressions, outfits, and/or the place at which the conversation is taking place are also consciously or subconsciously considered.

However, in the case of conversations within a virtual space, where there is almost no information available about the person, a user cannot know what kind of person to whom he/she is talking, or about what he/she should talk. Consequently, the user cannot perform the adjustments that he/she would perform in normal real word conversations. As a result, a user is often easily bored with virtual space conversation. Addressing a user who is about to exit the virtual space, addressing a user in a language which is unintelligible to the user, or inadvertently offending are also problems faced by virtual space communicators.

The object of the present invention is to provide technology that allows a user to obtain information about a person with whom the user is about to have conversation in a chaotic virtual space, prior to starting the conversation, thereby enabling easier and more effective network communications.

SUMMARY OF THE INVENTION

An aspect of the present invention provides a profile creation method for use in a conversation system having a plurality of terminal devices. The terminal devices can exchange messages among each other, via their connections to a network. The terminal devices share one of a plurality of virtual conversation spaces formed on the network. The method includes the steps of:

storing predetermined keywords and predetermined categories such that the keywords and categories are correlated to each other;

identifying a category that corresponds to a keyword if the message exchanged within the virtual space contains the keyword; and storing the identified category such that the category is correlated to a user.

The following explanation pertains to an example where a URL is utilized as a keyword. A category table in which the URLs and predetermined categories are correlated to each other is provided in advance. An existing DB can be utilized as a category table. Every time a message is sent to a virtual space, it is determined whether the message contains a URL. If the message contains a URL, a category that corresponds to the URL is identified based on the category table. Thereafter, the user who sent the URL is stored such that the user is correlated to the identified category. In this manner, users can be categorized according to the users' own messages.

Another aspect of the present invention provides a profile creation system for use in a conversation system having a plurality of terminal devices that can exchange messages among each other. The plurality of terminal devices are connected to a network and share one of a plurality of virtual conversation spaces formed on the network. The profile creation system comprises a category table, a user table, and administration means.

The category table stores predetermined keywords and predetermined categories such that the keywords and categories are correlated to each other. The user table stores users, predetermined keywords sent by the user, and the categories, such that the users, keywords, and categories are correlated to one another. The administration means obtains from the conversation system a message to be sent to the conversation space. The administration means determines based on the category table a category that corresponds to a keyword if the message contains the keyword, and writes in the user table the keyword sender's identification, the keyword, and the determined category.

This aspect of the invention offers the same effect as the first aspect of the invention.

Another aspect of the present invention provides the profile creation system as set forth in the previous aspect of the invention, wherein the user table stores valid period and time at which the keyword was sent, in addition to the users, the keywords, and the categories. In this system, the administration means further obtains from the conversation system the time at which the message containing the keyword was sent. The administration means writes in the user table the time of the message and the valid period of the message, in addition to the keyword sender, the keyword and the category, and deleting an entry whose valid period since the time of message has expired.

The time at which the user sent the keyword and the valid period are stored in the user table. The valid period may be pre-stored in the administration means. Alternatively, the administration means may accept user's configuration of valid period. By deleting an entry of a keyword whose valid period has expired, it is possible to create a user profile that reflects the current status of the user.

Another aspect of the present invention provides a profile creation system, wherein the user table stores the users, the keywords, the categories and message senders whose messages are related to who is related to the keyword. In this system, the administration means 1) creates a conversation log in the conversation space, 2) obtains from the conversation log and the conversation system the senders of messages that were sent before and/or after the message containing the keyword was sent, and 3) writes in the user table the senders as related users, such that the related users are correlated with the keywords.

When a keyword is sent, the administration means refers to the conversation log, and obtains the senders of a predetermined number of messages that were sent before the keyword was sent. The administration means then writes the senders' identification in the user table as related users. Also, the administration means obtains from the conversation system senders of a predetermined number of messages that were sent after the keyword was sent. The administration means writes the senders it obtained in the user table as related users.

It is presumed that messages that were sent just before or just after the keyword was sent are related to the message containing the keyword. Therefore, by storing the senders of those messages in the user table, various services can be provided. For instance, by specifying a keyword and a sender, a user can participate in a virtual conversation space in which he/she previously participated.

Another aspect of the present invention provides the profile creation system as set forth in the second mentioned aspect, wherein the user table stores the users, the keywords, the categories and rating data that indicates harmfulness for each user. In this system, the administration means updates the rating data of a user when a predetermined harmful keyword is sent.

For instance, the initial value of a user's rating data can be set as "0", and the rating data can be increased whenever the user sends a harmful keyword. In this manner, it is possible to perform processes such as prohibiting a user's participation in a virtual space and/or not broadcasting a user's message in the virtual space, depending on the rating data of the user. Thus enhancing the security within the virtual community is also possible.

Another aspect of the present invention provides a profile creation system wherein the conversation system processes messages exchanged by the conversation devices based on users' categories stored in the user table.

For instance, when an IRC client specifies a category upon creating a channel, an IRC server obtains from the administration means users who belong to the specified category. The administration means notifies the users of the creation of the channel based only on the obtained a users. It is also possible to administer messages based on the aforementioned rating data.

Another aspect of the present invention provides a computer-readable recording media having a profile creation program for use in a conversation system. The conversation system has a plurality of terminal devices that can exchange messages among each other. The plurality of terminal devices is connected to a network and shares one of a plurality of virtual conversation spaces formed on the network. The profile creation program executes steps of:

A—storing predetermined keywords and predetermined categories such that the keywords and categories are correlated to each other;

B—obtaining from the conversation system a message to be sent to the conversation space;

C—determining based on the category table a category that corresponds to the keyword if the message contains a keyword; and D—storing the sender of the keyword, the keyword, and the determined category, such that the sender, keyword, and category are correlated to one another.

This aspect of the invention provides the same effect as the first mentioned aspect of the present invention.

Another aspect of the present invention provides a profile creation method for use in a conversation system having a plurality of terminal devices. The terminal devices can exchange messages among each other. The plurality of terminal devices is connected to a network and shares one of a plurality of virtual conversation spaces formed on the network. The method utilizes a category table that can be referenced via the network. Predetermined keywords and predetermined categories are correlated to each other in the category table. The method comprises steps of:

A—identifying based on the category table a category that corresponds to the keyword if the message exchanged within the virtual space contains a keyword; and B—storing the identified category such that the category is correlated to a user.

This aspect of the invention offers a similar structure and effect when compared to the first mentioned aspect of the present invention. However, this aspect utilizes an existing category table.

Another aspect of the present invention provides a profile creation system for use in a conversation system. The conversation system has a plurality of terminal devices that can exchange messages among each other. The plurality of terminal devices is connected to a network and shares one of a plurality of virtual conversation spaces formed on the network. The profile creation system utilizes a category table that can be referenced via the network. Predetermined keywords and predetermined categories are correlated to each other in the category table. The profile creation system includes a user table and administration means. The user table stores users, predetermined keywords spoken by the user. Furthermore, the categories, such that the users, keywords, and the categories are correlated to one another. The administration means obtains from the conversation system a message to be sent to the conversation space. The administration means determines based on the category table whether or not the message contains a keyword. The administration means determines based on the category table a category that corresponds to a keyword if the message contains the keyword. The administration means writes in the user table the keyword sender, the keyword, and the determined category. This aspect of the invention offers a similar structure and effect when compared to the first mentioned aspect of the present invention. However, this aspect utilizes an existing category table.

Another aspect of the present invention provides a computer-readable recording media having a profile creation program for use in a conversation system. The conversation system has a plurality of terminal devices that can exchange messages among each other. The plurality of terminal devices is connected to a network and shares one of a plurality of virtual conversation spaces formed on the network. The profile creation program utilizes a category table that can be referenced via the network.

Predetermined keywords and predetermined categories are correlated to each other in the category table. The profile creation program executes steps of:

A—obtaining from the conversation system a message to be sent to the conversation space;

B—determining based on the category table whether or not the message contains a keyword;

C—determining based on the category table a category that corresponds to a keyword if the message contains the keyword; and D—storing the sender of the keyword, the keyword, and the determined category, such that the sender, the keyword, and the category are correlated to one another. This aspect of the present invention offers a similar structure and effect when compared to the first aspect of the invention. However, this aspect utilizes an existing category table.

BRIEF DESCRIPTION OF THE DRAWINGS

FIG. 1

A diagrammatical view of an entire structure of a profile creation system according to an embodiment of the present invention;

FIG. 2

A conceptual explanatory view of a category table of the profile creation system of FIG. 1;

FIG. 3

A conceptual explanatory view of a user data table of the profile creation system of FIG. 1;

FIG. 4

Figure 6:
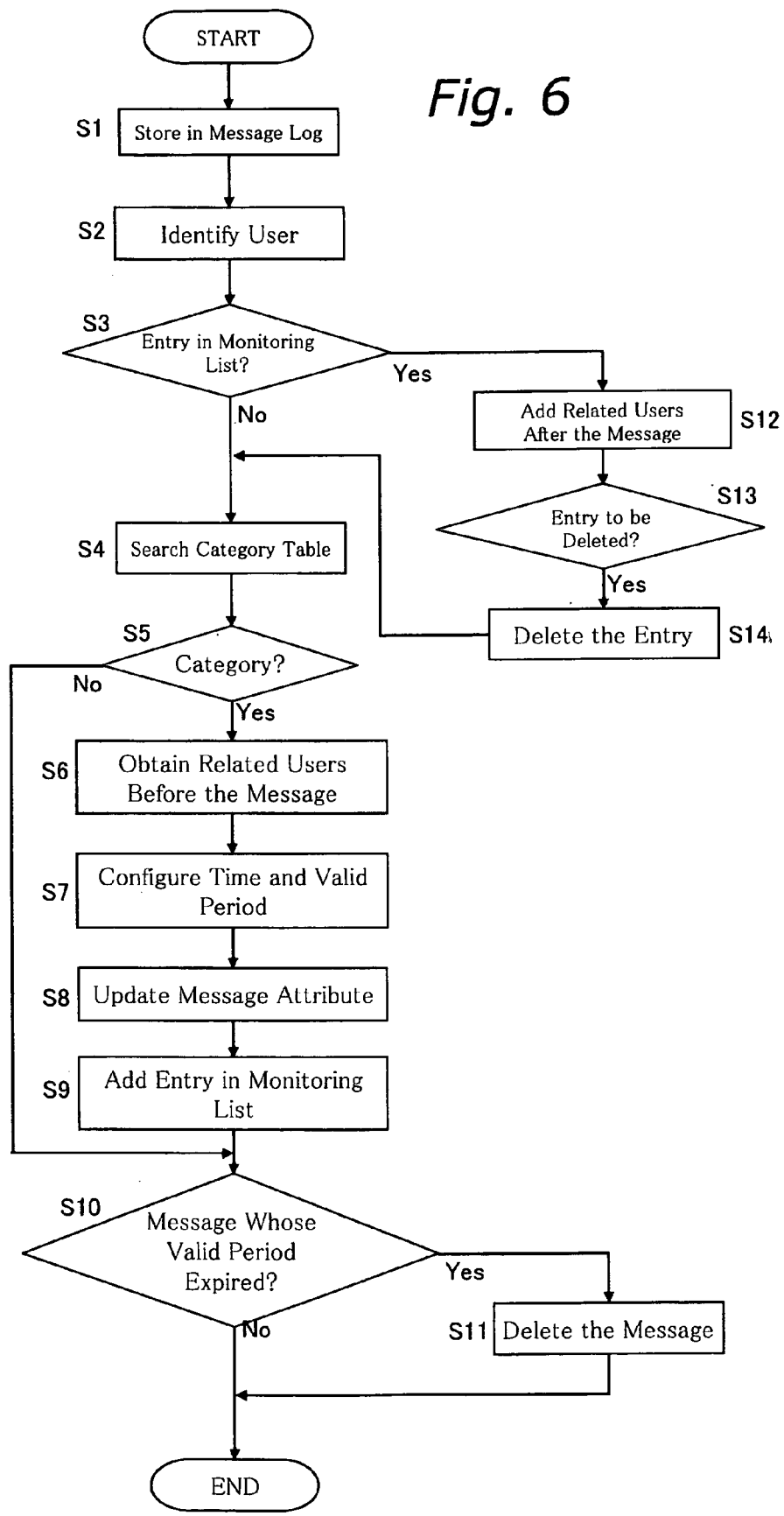
Figure 9:
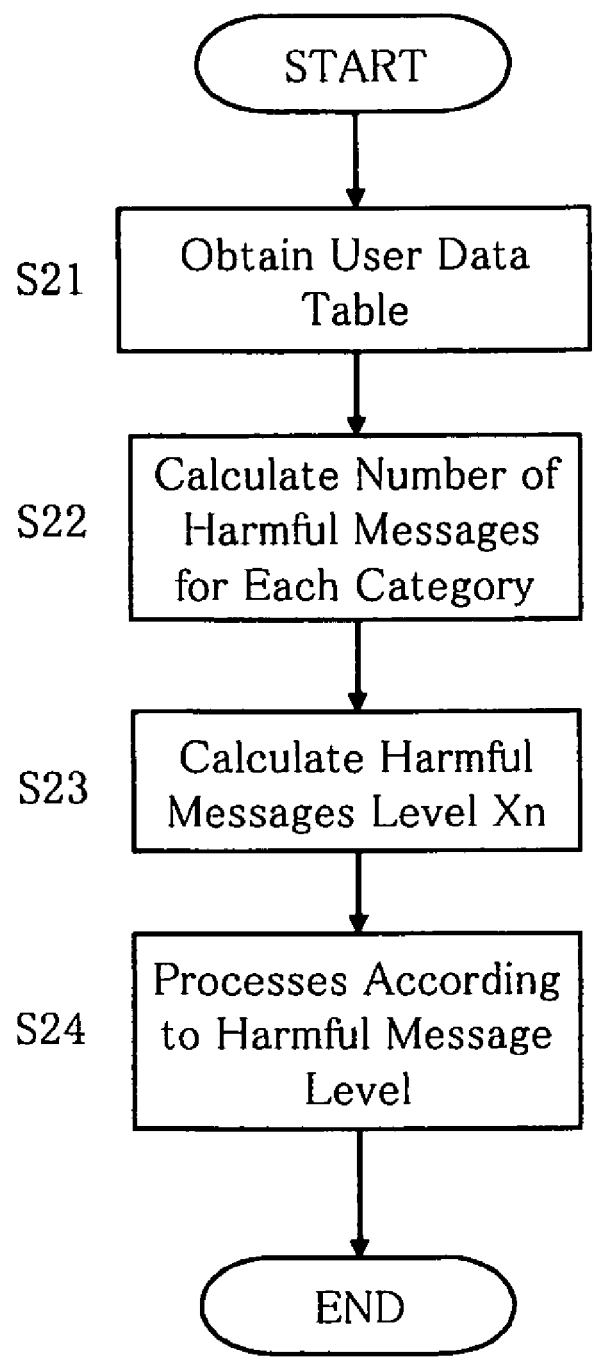

A conceptual explanatory view of list of harmful attribute stored in a rating processor of the profile creation system of FIG. 1;

FIG. 5 is a conceptual explanatory view of a processes table of the profile creation system of FIG. 1;

FIG. 6 is a flowchart of a message attribute update process of the profile creation system of FIG. 1;

FIG. 7 is a view of examples of messages that have been sent to a channel that is part of the profile creation system of FIG. 1;

FIG. 8 is a conceptual explanatory view of a monitoring list of the profile creation system of FIG. 1;

FIG. 9 is a flowchart of a rating data update process of the profile creation system of FIG. 1;

FIG. 10

An explanatory view of an example of a display organized by each category of the profile creation system of FIG. 1.

DESCRIPTION OF THE PREFERRED EMBODIMENTS

A profile creation system in accordance with the present invention will now be explained with reference to preferred embodiments.

First Embodiment

In this embodiment, a profile creation system as applied to an IRC will be explained. However, the system of the present invention can also be applied to other conversation systems.

Structure

FIG. 1 is an overall structural view of a profile creation system 1 in accordance with the first embodiment of the present invention. The profile creation system 1 in accordance with the present invention includes an IRC server 11 and an IRC client 12, which together form an IRC. The profile creation system 1 also includes a category DB 13, a user data DB 14, a user data administration server 15, a message administrator 16, and a rating processor 17.

In this embodiment, the message administrator 16 and the rating processor 17 are formed on the IRC server 11 side. Alternatively, the message administrator 16 and the rating processor 17 can be formed on the IRC client 12 side. The rating processor 17 is a constitutional element that is necessary when the user data DB 14 has rating data, which will be explained later.

(1) Category DB

The category DB 13 stores predetermined keywords and predetermined categories, such that the keywords and categories are correlated to each other. In this embodiment, a URL is utilized as an example of keyword. FIG. 2 is a conceptual view of a category table stored in the category DB 13. The category table 13 stores, to which of the predetermined categories each URL belongs. For instance, "URL1" can belong to the category "Hobby." One URL can belong to a plurality of categories.

As the category table of URL, data of a search engine which operates on the Internet, or data of a filtering software for URLs can be utilized. Alternatively, a category table that correlates predetermined words such as "car" and "travel" with categories may be provided and utilized, instead of utilizing URLs as keywords.

(2) User Data DB

User data DB 14 is not limited to any particular kind of structure. However, it is desirable to utilize a database that supports a user data database protocol LDAP (Light Weight Directory Access Protocol). FIG. 3 is a conceptual view of a user data table that is stored in the user data DB 14. The user data table stores user data for each user. In this embodiment, the user data includes a user ID, a password, chat-related data, personal data and message attribute data.

The user ID is identification data assigned to each user to identify the user uniquely. FIG. 3 shows a data of a user who is identified by the user ID "ID0001".

The password is authentication data to be utilized in updating the user data.

The chat related data includes a nickname of the user, the channel in which the user participates currently, a client host name, which uniquely identifies the user terminal, and the name of a server to which the user terminal is connected. The client host name uniquely identifies the user terminal.

The personal data includes data such as name, age, and occupation. Generally, the personal data are static data that are inputted and registered by the user. The personal data may include rating data. The rating data are data that indicate the user is harmful level; higher the rating data are, the more harmful the user is. The rating data will be explained later.

The message attribute data include URLs which the user has mentioned, for each of the categories predetermined in the aforesaid category DB 13. More specifically, the message attribute data include the category, the number of URLs mentioned in each category and message data. The message data include a message number, message contents, channel, date, period, and related users.

As the "Category," one of the categories predetermined in the category DB 13 is stored. In FIG. 3, "hobby" and "Internet" are written as the category.

The "Number of messages" is the number of times the URL that is correlated to the pertinent category has been mentioned. For instance, in FIG. 3, 15 URLs were mentioned, which are correlated to the category "Hobby."

The "Message number" is an identification number for identifying within a category a message as specified by the message data. For instance, "Message 1" and "Message 2" in FIG. 3 are the message numbers. The "Contents of message", includes keywords of user's messages, in other words the URL. In FIG. 3, the user "ID0001" has mentioned "URL1" and "URL2", as the URLs that belong to the category "Hobby." The "Channel" includes the name of the channel to which the URL was sent. For instance, the aforementioned "URL1" was sent to Channel #AAA. The "Date" includes the date on which the URL was mentioned. This date will be the base date for calculation of the valid period. For instance, The URL1 was mentioned on Jun. 7, 1999, at 13:55. The "Period" includes the duration of time during which the message specified by the message number is valid. For instance, the "Message 1" under the category "Hobby" in FIG. 3 is valid for one month, starting Jun. 7, 1999, 13:55. The "Related users" includes the ID of a user who has sent another message before and/or after the message containing the aforementioned URL was mentioned. For instance, in FIG. 3, users "ID0002" and "ID0003" have sent messages before and after the URL1. In this embodiment, the users who have sent immediately before and after the message containing URL will be the related users.

(3) Rating Data

The rating data are data that indicate the degree of the harmfulness of a user. In this embodiment, the rating data are at the harmful messages level. The rating data, in other words the harmful messages level are set initially as, for instance, "0". Every time the user mentions any of the URLs that are pre-stored as harmful URLs, the harmful messages level of the user increases.

(4) User Data Administration Server and Message Administrator

The user data administration server 15 registers and updates user data in the user data DB 14. The message administrator 16 obtains from the IRC server messages generated in each channel to perform updating process of the message attribute data of the user data DB 14. The message administrator 16 notifies the rating processor 17 of the update of the message attribute data. Further, the message administrator 16 can perform predetermined processes based on the message attribute data. For instance, the message administrator 16 can report to the IRC server 11 other users who belong to a certain category, or send the message attribute data to the IRC server 11. The message administrator 16 creates and stores a log of messages for each channel.

(5) Rating Processor

Upon receiving notification from the message administrator 16, the rating processor 17 updates the rating data of a user whose message attribute data have been updated. More specifically, URLs that are against public moral and decency are stored in the rating processor 17 in advance as harmful URLs. Once a URL is sent to a channel, the rating processor 17 calculates the rating data of the sender. The rating processor 17 directs the user data administration server 15 to rewrite the rating data. The rating processor 17 can determine how to process the message made by the user based on the rating data in the user data table, and direct the IRC server 11 to perform the process.

The rating data are calculated in the following manner. The rating data processor 17 stores a list of harmful attributes as shown in FIG. 4. FIG. 4 is a conceptual explanatory view of a list of harmful attributes stored in the rating processor 17. The list of harmful attributes stores weights of harmfulness level $C_1$, $C_2$, $C_3$ . . . for each category. The rating processor 17 calculates the harmful messages level $X_n$ for each user, based on the weight of each category.

More specifically, the harmful messages level $X_n$ is calculated as a sum of the weight of all categories multiplied by the number of messages sent by the user in each category. For instance, where the number of harmful messages sent by the user "ID0001" in the category "Hobby" is 15, and the number of harmful messages in the category "Internet" is 30. The harmful messages level $X_n$ of the user is calculated as: $15 \times C_1 + 30 \times C_3 = X_n$.

The rating processor 17 can also perform predetermined processes using the rating data. FIG. 5 is a conceptual explanatory view of the processes table stored in the rating processor 17. The rating processor 17 determines the process based on the rating data, and directs the IRC server 11 to perform the process.

In the example shown in FIG. 5, if the harmful message level is $X_n ] X_1$, the rating processor 17 directs the server to disconnect the connection with the user terminal. If $X_1 > X_n] X_2$, the message of the user is canceled by the server, such that the message is not broadcasted to other users. If $X_2 > X_n] X_3$, messages from the user cannot be accepted until a predetermined period of time elapses. If $X_3 > X_n] X_4$, the server sends a warning to the user when the user connects to the IRC server 11.

Process Flow (1) Message Attribute Process Flow

FIG. 6 is a flow chart of the message attribute update process performed by the message administrator 16. For the sake of simplification, the description below explains a case in which the messages shown in FIG. 7 have been sent to the channel #AAA. In addition, it is assumed that the user ID of the user "taro," who sent the URL to the channel is "ID0001," and his user data are as shown in the aforementioned FIG. 3. As described above, the related users written in the message attribute data are "hanako," who sent a message immediately before the message containing URL was sent, and "jiro" and "saburo", who sent two messages that immediately followed the message containing URL. Once a message is sent to any of the channels, the following process starts.

In step S1, the message administrator 16 obtains from the IRC server 11 the generated message, and stores it in the message log of the channel.

In step S2, the message administrator 16 obtains from the IRC server 11 data that are necessary to identify the user. Such data include, for instance, nickname, IP address, client host name, and log in name. In this embodiment, the message administrator 16 obtains the client host name from the IRC server 11.

In step S3, the message administrator 16 refers to the message log in order to determine whether any user in the channel #AAA to where the message has been sent has sent a message that contains a past URL. Then, the message administrator 16 determines whether the senders who have sent a message that contains the URL should be written in as the related users. To make this determination, the message administrator 16 utilizes a monitoring list that will be created in step S9. The step S9 will be explained later.

FIG. 8 is a conceptual explanatory view of the monitoring list. The monitoring list is created for each user. For instance, when the user "taro" sends a message that contains URL1, the following items will be written in the monitoring list of the user "taro":

Column under contents of message: "URL1";

Column under channel: The name of channel to which the message of the URL has been sent "#AAA";

Column under date: The data on which the message containing the URL has been sent; and Column under number of messages to be monitored: "2".

With regard to the contents of message, channel, and date, the same data are registered in the message attribute data of the user data (FIG. 3). Therefore, these data can be obtained by first storing the address of corresponding items in the user data, and then obtaining the actual data from the user data.

The number of messages to be monitored is the number of messages which were sent immediately after the message that contains the URL in question (hereinafter referred to as URL in question), and also are deemed related to the URL in question. In the example shown in the figure, the number of messages to be monitored is set forth with respect to messages that will be made after the message that contains the URL in question is sent. Alternatively, however, the number of messages to be monitored can be set for messages sent immediately before and immediately after the message containing the URL in question. There does not have to be an equal number of messages before and after the message containing the URL in question. Different numbers of related messages before and after the message containing the URL in question can be configured. For instance, there may be one message immediately before the message containing the URL in question, and five messages immediately after the message containing the URL in question.

The number of messages to be monitored decreases by one every time a message is detected immediately after the message in question is sent. When the number of messages to be monitored reaches 0, the entry is deleted from the monitoring list. It is also possible to set a counting messages region for monitoring, and determine the process based on the value of the counting region.

In this embodiment, the message administrator 16 determines whether there is a monitoring list for the channel #AAA to which the message has been sent. If there is a monitoring list, the message administrator 16 proceeds to step S12. If there is not, the message administrator 16 proceeds to step S4.

In step S4, the message administrator 16 searches the category table. More specifically, the message administrator 16 determines whether or not a user's message contains a URL. If it does, the message administrator 16 searches the category table for the URL, and determines the category. In this example, it is URL1 that has been sent. Therefore, the message administrator 16 determines that the category is "Hobby".

In step S5, the message administrator 16 determines whether or not there is a category that corresponds to the sent URL, or if the URL is not contained. If there is a category, the message administrator 16 proceeds to step S6. If there is no category that corresponds to the sent URL or if the URL is not contained, then the message administrator 16 proceeds to step S10, which will be explained later.

In step S6, the message administrator 16 obtains a predetermined number of messages sent immediately before the message containing the URL in question. As described above, if the monitoring list sets forth how many messages that were sent before the message containing the URL in question is sent should be obtained, the message administrator 16 refers to the monitoring list and determines the number of messages to be obtained. The message administrator 16 obtains these messages from the message log, which is stored for each channel. The message log stores messages as well as the nickname of the person who sent the message. The message administrator 16 obtains from the message log the nickname of the sender of the message. In this example, the message administrator 16 obtains "hanako" as the nickname of the related user. Furthermore, the message administrator 16 refers to the user data DB 14 to obtain the user ID that corresponds to the nickname "hanako," for instance "ID0002."

In step S7, the message administrator 16 obtains from the message log the time at which the message containing the URL was sent. Also, the message administrator 16 configures the valid period of the message. The valid period is configured in order to delete old messages from the message attribute data. A message that is much too old may not adequately reflect the current situation of the user. The valid period can be the same for all messages, or different for different categories. It is also possible to allow the user to configure the valid period.

In step S8, the message administrator 16 adds the data of message and valid period obtained in step S7 and the related users obtained in step S6, in the category of the message attribute data of the pertinent user determined in step S4. In this example, the message number "Message 16" is added under the category "Hobby." The message administrator 16 also updates the number of messages in the category, to which the message attribute data have been added. In this example, the number of messages by the user "ID0001" under "Hobby" has been updated to "16."

In step S9, the message administrator 16 creates an entry regarding the aforesaid URL1 in the monitoring list of the user specified in the aforementioned step S2. In other words, an entry that corresponds to the message containing the URL is created in the monitoring list of the user. FIG. 8 is a monitoring list at this point.

In step S10, the message administrator determines whether or not there is any message whose validation period has expired in the message attribute data. If the result is "Yes," then the message administrator 16 proceeds to step S11. If the result is "No," then the process is terminated.

In step S11, the message administrator 16 deletes the entry of the message attribute data whose valid period has already expired from the user data.

In the aforementioned step S3, if the message administrator 16 determines that there is an entry in the monitoring list, the message administrator 16 proceeds to step S12. In step S12, the message administrator 16 writes in the message attribute data of certain users the user ID of the sender of the message that has been created. The certain user is a user within the channel #AAA to which the message has been sent, who has an entry of the message to the channel #AAA in the monitoring list. More specifically, if "jiro" and "saburo" sent messages after "taro"'s message, "jiro" and "saburo" are written in the message attribute data of "taro" as related users of "Message 16."

The message administrator 16 decrements the number of messages to be monitored in the monitoring list. In this example, the number of messages identified by the contents of message "URL1," channel "#AAA," and date "1999/06/07 18:55" is decreased by one.

In step S13, the message administrator 16 determines whether or not there is an entry that is to be deleted from the monitoring list. More specifically, the message administrator 16 determines whether or not there is an entry whose number of messages to be monitored is "0". If the result is "Yes," then the message administrator 16 proceeds to step S14. If the result is "No," the message administrator 16 proceeds to the aforementioned step S5.

In step S14, the message administrator 16 deletes from the monitoring list an entry whose number of messages to be monitored is "0." Then, the message administrator 16 returns to the aforementioned step S4.

The message administrator 16 can calculate the interval between the time the related message was sent and the time the message containing the URL in question was sent. If the time interval is more than a predetermined time period, it is possible for the message administrator 16 not to write in the message attribute data the user ID of the related user obtained. This is because if the time interval between the two messages is long, it is less likely that these messages are related.

(2) Rating Data Updating Process

FIG. 9 is a flow chart of the rating data updating process and a process based on the rating data, which are performed by the rating processor 17. Once the rating processor 17 is notified by the message administrator 16 that the message attribute data have been updated, the rating processor 17 starts the following process.

In step S21, the rating processor 17 obtains a user data table of the user whose message attribute data have been updated. The user data table can be obtained from the user data administration server 15, or from the message administrator 16.

In step S22, the rating processor 17 calculates the number of harmful messages sent by the user for each category. More specifically, the rating processor 17 detects harmful URLs from the URLs sent by the user, then calculates the number of times the harmful URLs has been sent for each category.

In step S23, the rating processor 17 calculates the harmful messages level Xn of the user.

In step S24, the rating processor 17 determines a process that corresponds to the harmful messages level Xn, which has been calculated. Then, the rating processor 17 directs the IRC server 11 to perform the process. Thereafter, the process is terminated.

Alternatively, the rating processor 17 can first determine whether or not a newly mentioned URL is harmful, and then update the harmful messages level Xn of the user if the URL is harmful.

An Example of Services Based on User Data

By utilizing message attribute data and rating data created by the aforesaid profile creation system, various services that make communications on a conversation system such as IRC easier can be provided. Below are examples of such services.

(1) Providing Service that Utilizes Message Attribute Data (1-1) Talking with Someone Who is in the Same Category By specifying the channel name and the category, a user can invite to the channel only users who belong to a certain category. For instance, a command "INVITEEX #Channel Category" is pre-stored in the IRC. Here, the name of a channel to which users will be invited will be written in "#Channel." When the command is sent by the IRC client 12, the IRC server 11 sends the command to terminals of other users who belong to the designated category. The command administrator 16 detects the command, and searches the user data DB 14 for users who belong to the category specified in the command. Then the command administrator 16 reports the users to the IRC server 11.

(1-2) Sending a Message to Someone Who Belongs to the Same Category

For instance, a user can send a message to users who belong to a specific category by specifying the channel name and category. For instance, a command "PRIVMSGEX Category MSG" is pre-stored in the IRC. Here, the category specified by the user will be written in "Category." A text message inputted by the user will be written in "MSG". Once the command is sent by the IRC client 12, the IRC server 11 distributes the command to terminals of the users who belong to the designated category. As in the aforementioned case (1), the command administrator 16 detects the command, searches the user data DB, and reports the users it found to the IRC server 11.

(1-3) Creating a Friends List by Category

A user can display by the IRC client 12 a friends list by category. In the IRC, the IRC server 11 reports predetermined data such as nickname of a user within a channel to the IRC client 12. Then, the IRC server 11 reports the user's category as well as the predetermined data. The IRC server 11 can obtain the user's category from the message administrator 16. The timing at which the user's category is obtained can be when the IRC client joins the channel.

(1-4) Displaying Users within Channel by Category

Figure 10:
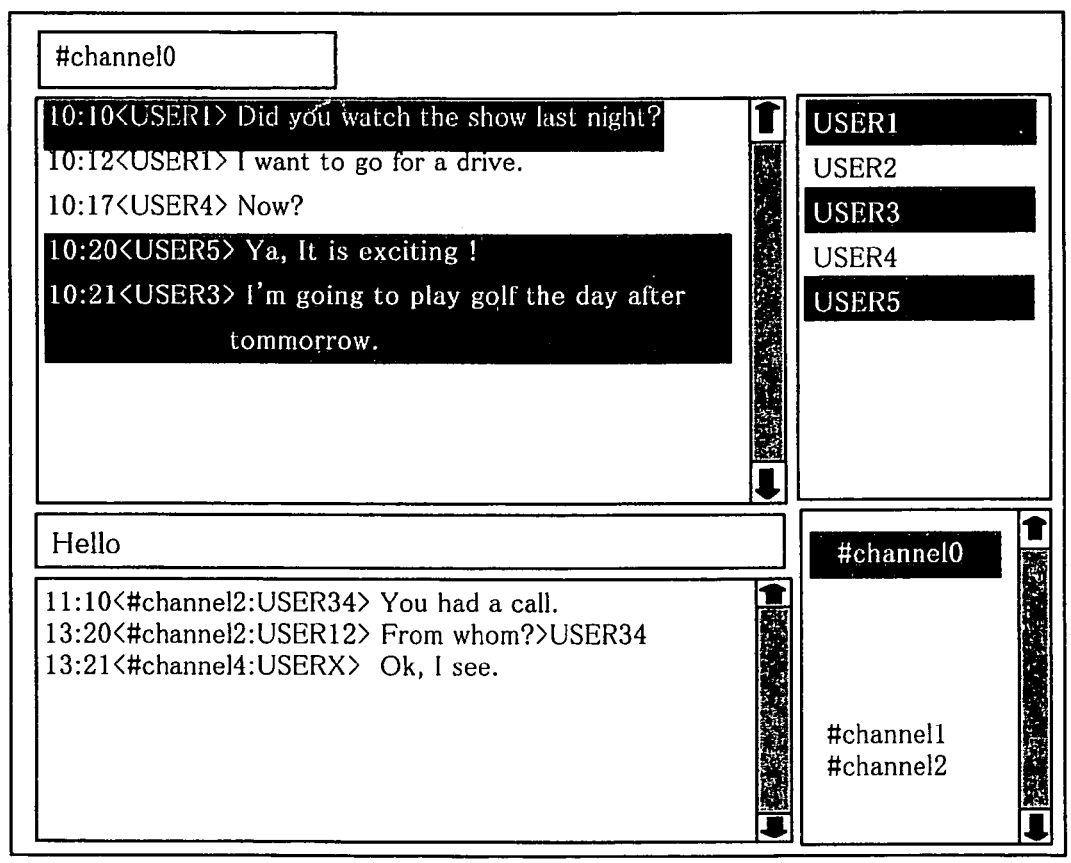

FIG. 10 is an example of a display of users within a channel organized by category. As stated previously in (3), if the user's category is reported to the IRC client 12, the IRC client 12 can display users and messages from the user in different colors and styles for different categories.

(2) Services Based on Rating Data

As in the case of the message attribute data, the rating data can be utilized to make communications easier. Below are examples that are not listed in the aforementioned processes table shown in FIG. 5.

(2-1) Limiting Creation of Channel and Join a Channel

The IRC server 11 can limit creation of a channel and/or entrance into a channel by a user whose rating data are high. For instance, the aforementioned processes table shown in FIG. 5 can have "Creation of channel prohibited" and/or "Join a channel prohibited command." When a "JOIN #Channel" is sent from the IRC client 12, the rating processor 17 determines whether the creation of channel or join a channel specified should be allowed based on the rating data of the sender and the processes table. The IRC server 11 allows or denies entrance into the channel based on the result of the determination.

The command "JOIN #Channel" is an existing command on the IRC to create or enter into a channel designated in "#Channel."

(2-2) Limiting Number of Channels to Join

The IRC server 11 can limit the number of channels in which a user can join, based on the rating data of a user. In this case, the processes table shown in FIG. 8 has for each harmful messages level the maximum number of channels in which a user can join. Upon receiving the aforesaid JOIN command from a user, the rating processor 17 reports to the IRC server 11 the number of channels which the user can join. Since the IRC server 11 knows the number of channels which each user joins, the IRC server 11 compares the number of channels the user can join and the number of channel the user joins. Accordingly, the IRC server allows or denies the user's joining the channel.

(2-3) Blocking Invitation into a Channel by a Harmful User

If a user whose rating data are above a predetermined value sends an invitation command to a certain channel, the IRC server 11 does not broadcast the invitation command to other users. As in the previous cases, the processes table sets forth that an invitation command should be ignored. In this case, the rating processor 17 determines a process to ignore the invitation command based on the rating data of the sender, then reports the process to the IRC server 11. In this manner, an invitation to a channel by a harmful user can be blocked.

(2-4) Preventing Inviting a Harmful User to a Channel

The processes table sets forth that an invitation command to a channel sent by another user should not be sent to a user whose rating data are above certain value.

In this case, the rating processor 17 determines that an invitation command should not be sent based on the rating data of receiver, and then reports the process to the IRC server 11. The IRC server 11 stops sending an invitation command to the harmful user, based on the determination of the rating processor 17. In this manner, a harmful user will not be invited to a channel inadvertently.

(2-5) Limiting Messages

The processes table sets forth that a text message by a user whose rating data are above a certain value is not to be distributed to other users. The processes table also sets forth that messages of other users are not to be distributed to the harmful user. The rating processor 17 determines, based on the rating data of the sender or the receiver, whether or not a message should be distributed, and to whom the message should be distributed. Then the rating processor 17 reports the result of determination to the IRC server 11. In this manner, harmful messages can be prevented in advance. It also prevents messages of other users from being sent to a user who often sends inappropriate messages.

(2-6) Controlling Operation of an Agent

A chat system sometimes has a software robot so called agent, which creates conversation log and performs various replies to users' messages. If a user whose rating data are above a certain value sends a message or a command to an agent, the rating processor 17 directs the IRC server 11 to stop distributing the message or the command from the user. In this manner, the user's behavior by which the agent may be potentially operated in an inappropriate manner can be prevented, thereby securing the safety within the chat community.

Second Embodiment

In the first embodiment, the user's category is determined based on a predetermined keyword within the text message. However, the category can be determined based on keywords not only in text file, but in structurized document written by mark up language such as XML and SGML. Further, it is also possible to make the portion of the structurized document other than the contents, in other words the meta data, a base for determining category.

When the category is determined based on the structurized document, first, a structure analysis is conducted on the structurized document. The category is determined for each tag. Then, the message attribute data of the user are updated in the same manner as in the first embodiment.

Third Embodiment

Services based on message attribute data and rating data can similarly be offered in one to one conversation communications. Below are examples of such services.

(1) Limiting Conversation Itself

A request for conversation can be stopped based on the rating data of a user who wanted to start a one—one conversation, or a user who initiated contact. It prevents an inadvertent establishment of one to one connection that involves a harmful user.

(2) Limit Obtainment of User Data

Provision of user data can be limited based on the rating data of a user who attempts to obtain user data of other users. For instance, the processes table sets forth different levels of disclosure of user data for different harmful messages levels.

(3) Limit to Distribute Messages

As in the first embodiment (2-5), it is possible to prevent a message from being sent, depending on the rating data of a user who sent the message or the receiver.

EFFECT OF THE INVENTION

By utilizing this invention, it is possible to create a profile which reflect users' interest and characteristics on a real time basis. By using this profile, data that helps communications in virtual space can be provided to users, thereby promoting easy communications.

While only selected embodiments have been chosen to illustrate the present invention, to those skilled in the art it will be apparent from this disclosure that various changes and modifications can be made herein without departing from the scope of the invention as defined in the appended claims. Furthermore, the foregoing description of the embodiments according to the present invention is provided for illustration only, and not for the purpose of limiting the invention as defined by the appended claims and their equivalents.

What is claimed is:

1. A profile creation method for use in conversation system having a plurality of terminal devices that can exchange messages among each other, the plurality of terminal devices being connected to a network and sharing one of a plurality of virtual conversation spaces formed on the network, said method comprising:

providing predetermined keywords and predetermined categories such that the keywords and categories are correlated to each other;

monitoring whether a message sent to a virtual space contains at least one of the keywords;

identifying a category that corresponds to a keyword if the message sent to the virtual space contains the keyword, according to the monitoring;

creating a profile of a user by correlating the identified category to the user who sent the message to the virtual space;

storing a valid period for the message and a time at which the message containing the keyword was sent; and deleting an entry in the user profile upon expiration of the valid period for the message since the time of the message.

2. The method of claim 1, wherein the predetermined categories are a personal interest and a personal characteristic, and the method further comprises:

providing message-attribute-based virtual space services to users in the virtual conversation space according to the profile of the user created based upon the correlating of the personal interest and the personal characteristic predetermined categories to the user.

3. The method of claim 2, further comprising:
rating the user according to the personal interest and the personal characteristic categories correlated to the user based upon the message transmitted by the user; and
providing the rating to the users as one of the message-attribute-based virtual space services.

4. A profile creation system for use in a conversation system having a plurality of terminal devices that can exchange messages among each other, the plurality of terminal devices being connected to a network and sharing one of a plurality of virtual conversation spaces formed on the network, said profile creation system comprising:
a category table in which predetermined keywords and predetermined categories are stored such that the keywords and categories are correlated to each other;
a user table that stores users, predetermined keywords sent by the users via messages, the categories, and valid periods for the messages and times at which the messages containing the keywords were sent, such that the users, keywords, and categories are correlated to one another; and
administration means for
monitoring in the conversation system a message sent by a user to a conversation space,
determining based on said category table a category that corresponds to a keyword if the message contains the keyword according to the monitoring,
creating a profile of the user by writing in said user table the user as a sender of the message, the keyword in the message, and the determined category,
obtaining from the conversation system the time at which the message containing the keyword was sent,
writing in said user table the time of the message and the valid period of the message, in addition to the keyword sender, the keyword and the category, and
deleting an entry of the user profile upon expiration of the valid period of the message since the time of the message.

5. The profile creation system as set forth in claim 4, wherein
said user table stores the users, the keywords, the categories and message senders whose messages are related to the keywords; and
said administration means creates a conversation log in the conversation space, obtains from the conversation log and the conversation system the senders of messages that were sent before and/or after the message containing the keyword was sent, and writes in said user table the senders as related users, such that the related users are correlated with the keywords.

6. The profile creation system as set forth in claim 4, wherein
said user table stores the users, the keywords, the categories and rating data that indicates harmfulness for each user; and
said administration means updates the rating data of a user when a predetermined harmful keyword is sent.

7. The profile creation system as set forth in claim 4, wherein the conversation system processes messages exchanged by the conversation devices based on users' categories stored in said user table.

8. The system of claim 4,
wherein the predetermined categories are a personal interest and a personal characteristic, and
wherein the administration means further provides message-attribute-based virtual space services to users in the virtual conversation space according to the profile of the user created based upon the correlating of the personal interest and the personal characteristic predetermined categories to the user.

9. The system of claim 8, wherein the administration means further:
rates the user according to the personal interest and the characteristic categories correlated to the user based upon the message transmitted by the user; and
provides the rating to the users as one of the message-attribute-based virtual space services.

10. A computer-readable recording medium having a profile creation program for use in conversation system having a plurality of terminal devices that can exchange messages among each other, the plurality of terminal devices being connected to a network and sharing one of a plurality of virtual conversation spaces formed on the network, said profile creation program executing a process comprising:
A: storing predetermined keywords and predetermined categories such that the keywords and categories are correlated to each other;
B: monitoring in the conversation system a message sent to a virtual conversation space;
C: determining based on the category table a category that corresponds to a keyword if the message contains the keyword, according to the monitoring; and
D: creating a profile of a sender of the message by correlating the determined category to the sender of the message;
E: storing a valid period of the message and a time at which the message containing the keyword was sent; and
F: deleting an entry in the user profile upon expiration of the valid period of the message since the time of the message.

11. A profile creation method for use in a conversation system having a plurality of terminal devices that can exchange messages among each other, the plurality of terminal devices being connected to a network and sharing one of a plurality of virtual conversation spaces formed on the network, said method utilizing a category table that can be referred to via the network, predetermined keywords and predetermined categories being correlated to each other in the category table, said method comprising:
monitoring whether a message sent to a virtual conversation space contains at least one of the keywords;
identifying based on the category table a category that corresponds to a keyword if the message sent to the virtual space contains the keyword, according to the monitoring;
creating a profile of a user by correlating the identified category to the user who sent the message to the virtual space and configuring a valid period for the message; and
deleting an entry in the user profile upon expiration of a valid period of the message since a time of the message.

12. A profile creation system for use in conversation system having a plurality of terminal devices that can exchange messages among each other, the plurality of terminal devices being connected to a network and sharing one of a plurality of virtual conversation spaces formed on the network, said profile creation system utilizing a category table that can be referred to via the network, predetermined keywords and predetermined categories being correlated to each other in the category table, said profile creation system comprising:

a user table storing users, predetermined keywords spoken by the users, the categories, and valid periods of the messages and times at which the messages containing the keywords were sent, such that the users, keywords, and the categories are correlated to one another; and administration means for monitoring in the conversation system a message sent by a user to a virtual conversation space, determining based on the category table whether the message contains one of the keywords, determining based on the category table a category that corresponds to a keyword if the message contains the keyword according to the monitoring, creating a profile of the user by writing in said user table the user as a sender of the message, the keyword of the message, and the determined category, obtaining from the conversation system the time at which the message containing the keyword was sent, writing in said user table the time of the message and the valid period of the message, in addition to the keyword sender, the keyword and the category, and deleting an entry of the user profile upon expiration of the valid period of the message since the time of the message.

13. A computer-readable recording medium having a profile creation program for use in a conversation system having a plurality of terminal devices that can exchange messages among each other, the plurality of terminal devices being connected to a network and sharing one of a plurality of virtual conversation spaces formed on the network, said profile creation program utilizing a category table that can be referenced via the network, predetermined keywords and predetermined categories being correlated to each other in the category table, said profile creation program executing a process comprising:

A: monitoring in the conversation system a message sent to a virtual conversation space;

B: determining based on the category table whether the message contains one of the keywords;

C: determining based on the category table a category that corresponds to the keyword if the message contains the keyword, according to the monitoring;

D: creating a profile of a sender of the message by correlating the sender to the determined category and configuring a valid period for the message;

E: deleting an entry in the user profile upon expiration of a valid period of the message since a time of the message.

* * * * *

UNITED STATES PATENT AND TRADEMARK OFFICE
CERTIFICATE OF CORRECTION

| | |
|---|---|
| PATENT NO. | : 7,181,518 B1 |
| APPLICATION NO. | : 09/628190 |
| DATED | : February 20, 2007 |
| INVENTOR(S) | : Yasuhide Matsumoto et al. |

It is certified that error appears in the above-identified patent and that said Letters Patent is hereby corrected as shown below:

Title Page, Column 2 (U.S. Patent Documents), Line 3, change "6,336,948" to --6,366,948--.

Title Page, Column 2 (Foreign Patent Documents), Line 4, below, after
"JP         11-96101         4/1999"  insert
--JP        09-212505        8/1997
JP          11-136276        5/1999--.

Title Page, Column 2, under the list FOREIGN PATENT DOCUMENTS, insert
--OTHER REFERENCES
Zoku Dennomou Kohikan, C. Magazine, SoftBank Corp., Vol. 9, No. 11, November 1, 1997, pp. 77-86--.

Signed and Sealed this

First Day of April, 2008

JON W. DUDAS
*Director of the United States Patent and Trademark Office*